United States Patent
Maruo et al.

[11] Patent Number: 6,091,219
[45] Date of Patent: Jul. 18, 2000

[54] STRUCTURE OF ROBOT CONTROL SYSTEM

[75] Inventors: Satoshi Maruo, Kariya; Takamitsu Inagaki, Aichi-ken; Yoshio Kawamura, Anjo; Akira Ogawa, Kariya; Noritaka Yatsuya; Masatoshi Kojima, both of Aichi-ken, all of Japan

[73] Assignee: Denso Corporation, Kariya, Japan

[21] Appl. No.: 09/168,348

[22] Filed: Oct. 8, 1998

[30] Foreign Application Priority Data

Oct. 8, 1997 [JP] Japan .................................. 9-275770
Mar. 4, 1998 [JP] Japan .................................. 10-052011

[51] Int. Cl.$^7$ .............................. G05B 11/32; G05B 9/02
[52] U.S. Cl. .......................... 318/562; 318/569; 318/563; 318/625
[58] Field of Search .................... 318/625, 562, 318/568, 567, 569, 563

[56] References Cited

U.S. PATENT DOCUMENTS

| | | | |
|---|---|---|---|
| 3,845,284 | 10/1974 | Taguchi et al. | 235/150.1 |
| 3,906,323 | 9/1975 | Ono et al. | 318/563 |
| 4,240,016 | 12/1980 | Inaba et al. | 318/562 |
| 4,671,732 | 6/1987 | Gorman | 414/735 |
| 4,794,513 | 12/1988 | Muller | 364/167.01 |
| 4,907,467 | 3/1990 | Toyoda et al. | 74/479 |
| 5,142,623 | 8/1992 | Staab et al. | 395/200 |
| 5,552,688 | 9/1996 | Haga | 318/569 |

FOREIGN PATENT DOCUMENTS

| | | |
|---|---|---|
| 59-100903 | 6/1984 | Japan . |
| 59-193649 | 11/1984 | Japan . |
| 60-5644 | 1/1985 | Japan . |
| 7-312889 | 11/1995 | Japan . |

*Primary Examiner*—Brian Sircus
*Attorney, Agent, or Firm*—Pillsbury Madison & Sutro LLP

[57] ABSTRACT

A robot control system is provided which controls a plurality of servomotors for moving a hand and articulated arms of a robot. The robot control system includes a plurality of position detectors, a motor control driver, and a serial communication path. The position detectors detect rotational positions of the servomotors and output the rotational positions in the form of serial data, respectively. The serial communication path is disposed between the motor control driver and the position detectors to transmit request signals provided by the motor control driver to the position detectors to request the position detectors to output the rotational positions.

3 Claims, 11 Drawing Sheets

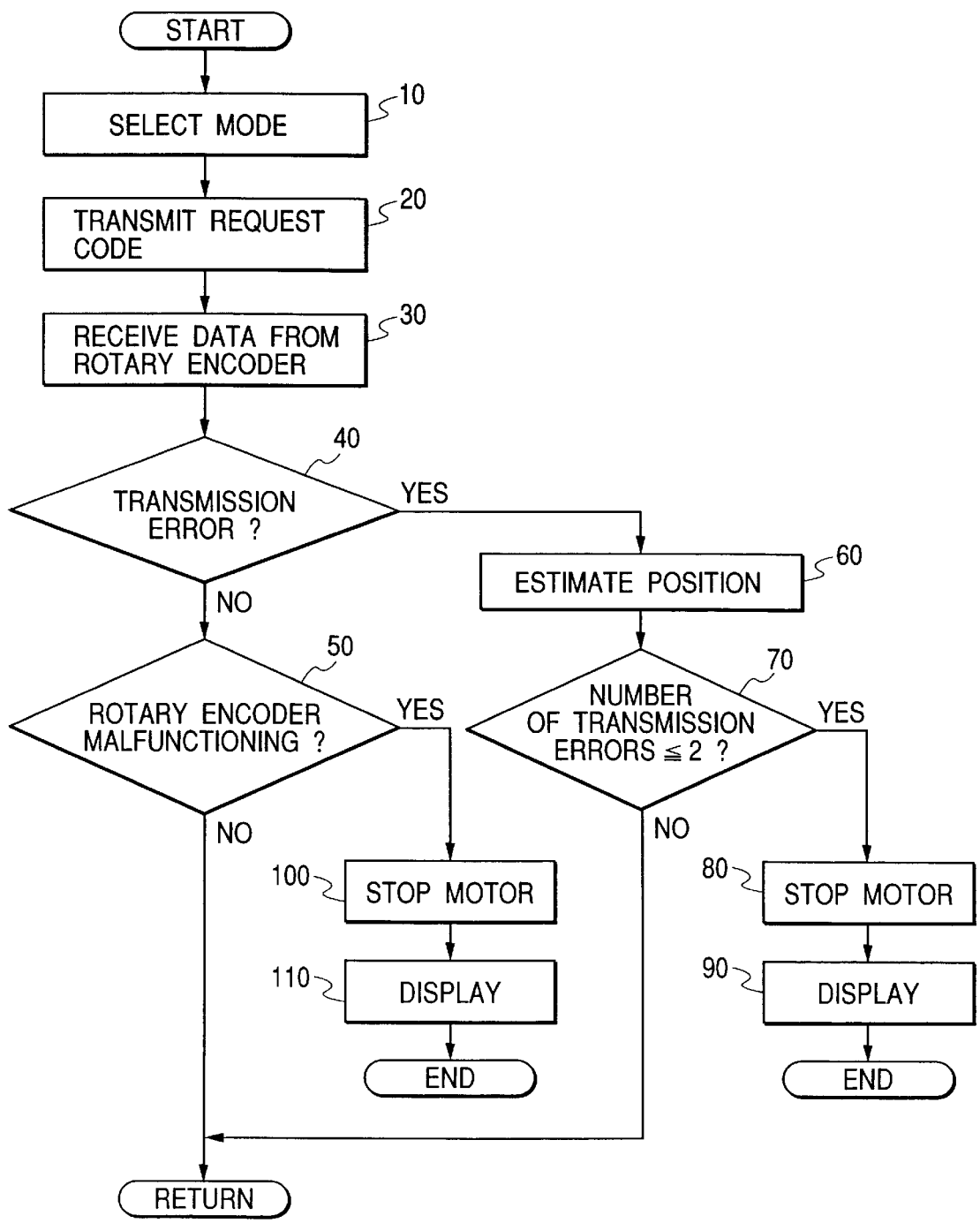

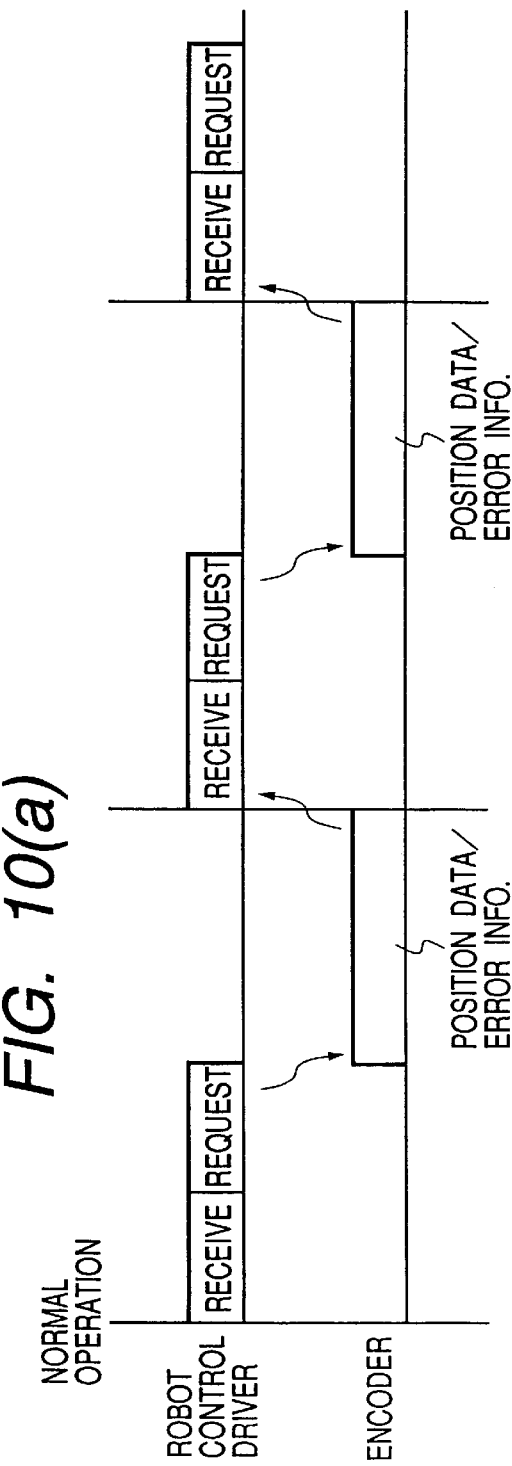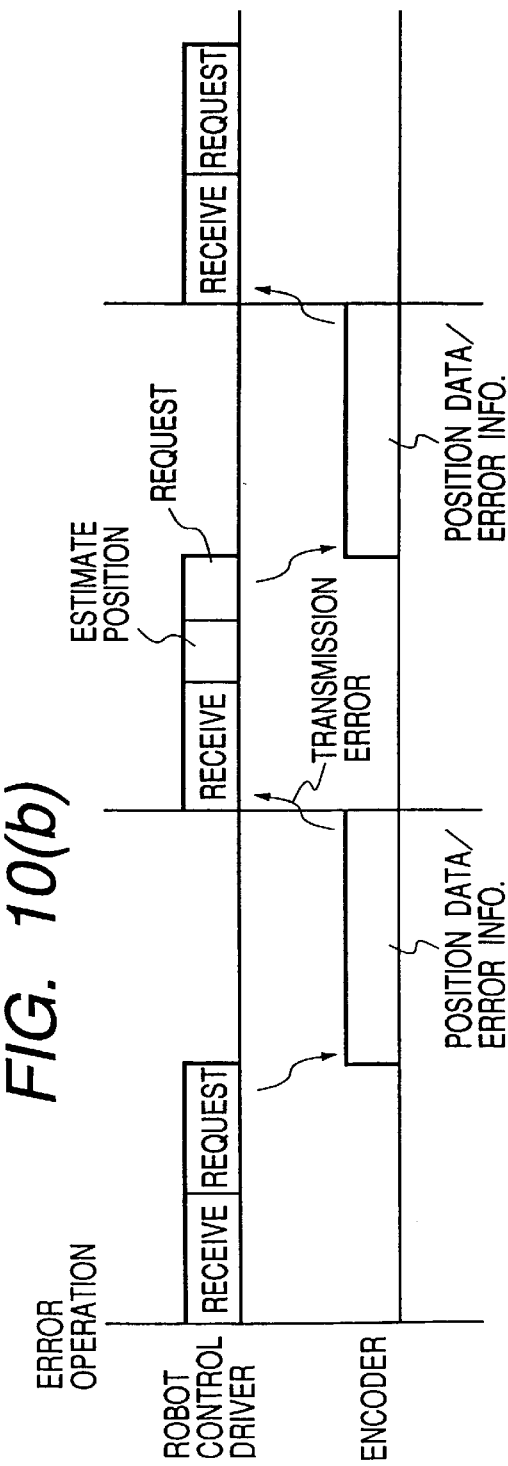

STRUCTURE OF ROBOT CONTROL SYSTEM

BACKGROUND OF THE INVENTION

1. Technical Field of the Invention

The present invention relates generally to a robot control system designed to control a plurality of servomotors for moving articulated arms, etc., and more particularly to an improved structure of a robot control system capable of communicating with position detectors for servomotors through a small number of signal lines.

2. Background of Related Art

FIG. 12 shows a conventional robot control system consisting essentially of the robot driver 9 which controls an operation of the robot 8. The robot 8 includes the rotary encoder 1 and differential drivers 2, 3, and 4. The rotary encoder 1 is an absolute encoder which measures an angular position of a servomotor and outputs, as is well known, A- and B-phase incremental signals A and B and an absolute signal Rx. The A- and B-phase incremental signals A and B and the absolute signal Rx are each converted by the differential drivers 2 to 4 into two signals which are, in turn, transmitted to the robot driver 9 through communication paths 5 to 7, respectively. The signals transmitted through the communication paths 5 to 7 are converted by the differential receivers 10 to 12 into the original A- and B-phase incremental signals and the absolute signal Rx and inputted to the I/F (Interface) 13. The reference numbers 14 to 16 indicate exclusive OR circuits for detecting wire-breakage.

As will be apparent from the above, the encoder 1 of the conventional robot control system is connected to the robot driver 9 through the six signal lines. When the degree of freedom of the robot 8 is, for example, four (4), four servomotors are used, thus requiring four rotary encoders which are connected to the robot driver 9 through a total of twenty four signal lines. When the degree of freedom of the robot 8 is six (6) or eight (8), thirteen six or fourteen eight signal lines are required.

The signal lines are usually tied up in a bundle and lead into the robot 8. The more the signal lines, the thicker the bundle, thus requiring a large amount of space within the robot 8 for leading the signal lines to the servomotors. This results in increased overall size of the robot 8. Additionally, the increase in signal lines will increase the possibility of wire-breakage causing an error in communication between the robot 8 and the robot driver 9.

SUMMARY OF THE INVENTION

It is therefore a principal object of the present invention to avoid the disadvantages of the prior art.

It is another object of the present invention to provide an improved structure of a robot control system which is capable of communicating with position detectors for servomotors through a small number of signal lines.

According to one aspect of the present invention, there is provided a robot control apparatus which comprises: (a) a plurality of servomotors which move preselected components of a robot, respectively; (b) a plurality of position detectors which detect rotational positions of the servomotors and output the rotational positions in the form of serial data, respectively; (c) a motor control driver which controls the servomotors based on the rotational positions detected by the position detectors and required positions; and (d) a serial communication path disposed between the motor control driver and the position detectors to transmit request signals provided by the motor control driver to the position detectors to request the position detectors to output the rotational positions, the position detectors being connected to the serial communication path in parallel to each other.

In the preferred mode of the invention, each of the request signals is either of a first request signal and a second request signal. The first request signals carries an ID number assigned to specified one of the position detectors. When the first request signals are outputted from the motor control driver, one of the position detectors matching with the ID number indicated by the first request signals transmits the rotational position to the motor control driver. When the second request signals are outputted from the motor control driver, the position detectors transmit the rotational positions, in sequence, to the motor control driver.

The motor control driver detects an error in data transmission between each of the position detectors and the motor control driver by checking a format of the serial data outputted from each of the position detectors, an error check code contained in the serial data, and a time required for the transmission between each of the position detectors and the motor control driver.

Each of the servomotors has an electromagnetic brake which activates when disconnected to a brake power supply. Electric power provided by the brake power supply is stepped down in voltage and supplied to each of the position detectors.

Each of the servomotors includes a motor casing having formed thereon a spigot and an annular sealing member installed in the spigot. The robot has a motor mount which has formed therein a socket in which the spigot of the motor casing is fitted through the annular sealing member with a portion of the motor mount around the socket connecting directly with a portion of the motor casing around the spigot for grounding the motor casing through the robot.

The robot control apparatus further includes a storage circuit which stores therein the rotational positions detected by the position detectors in a cycle and a position estimating circuit which estimates the rotational positions of the servomotors based on the rotational positions derived in previous cycles when transmission between the position detectors and the motor control driver is in error in this cycle. The motor control driver controls the servomotors based on the estimated rotational positions.

When an error in transmission between the position detectors and the motor control driver continues to occur a preselected number of times, the motor control driver stops the servomotors.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings:

FIG. 9 is a flowchart of a program performed by a robot control system;

FIGS. 10(a) and 10(b) are time charts which show signal transmission between a robot control driver and each rotary encoder in a normal operation mode and in an error operation mode;

DESCRIPTION OF THE PREFERRED EMBODIMENT

Figure 1:
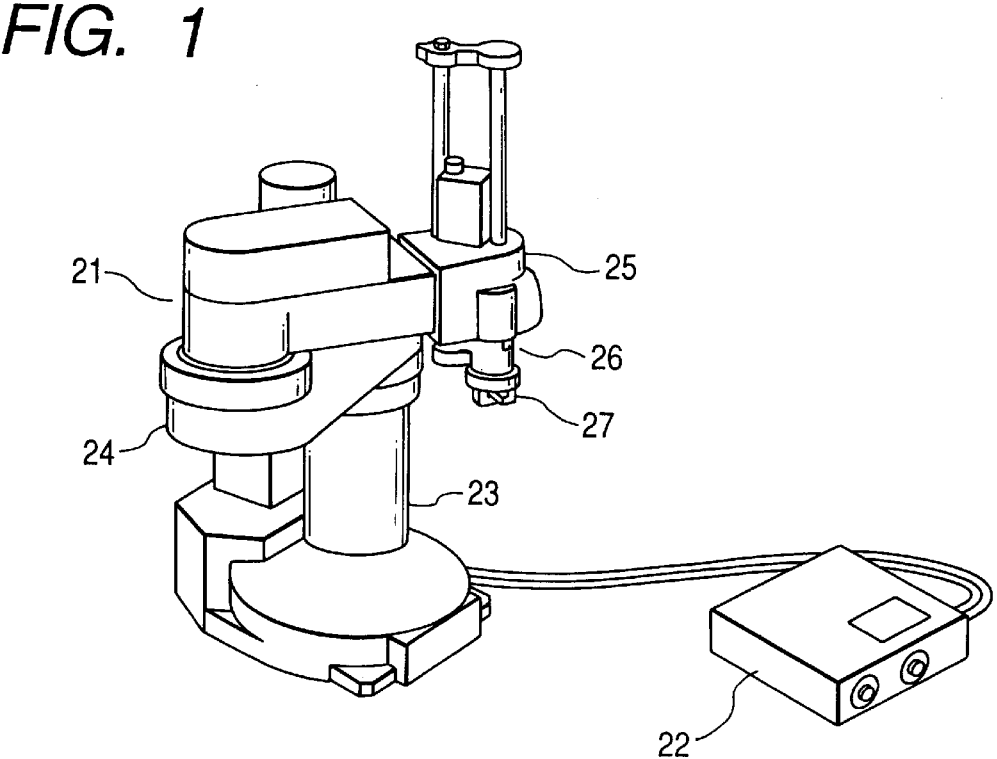
FIG. 1 is a perspective view which shows a robot control system according to the present invention.
Figure 2:
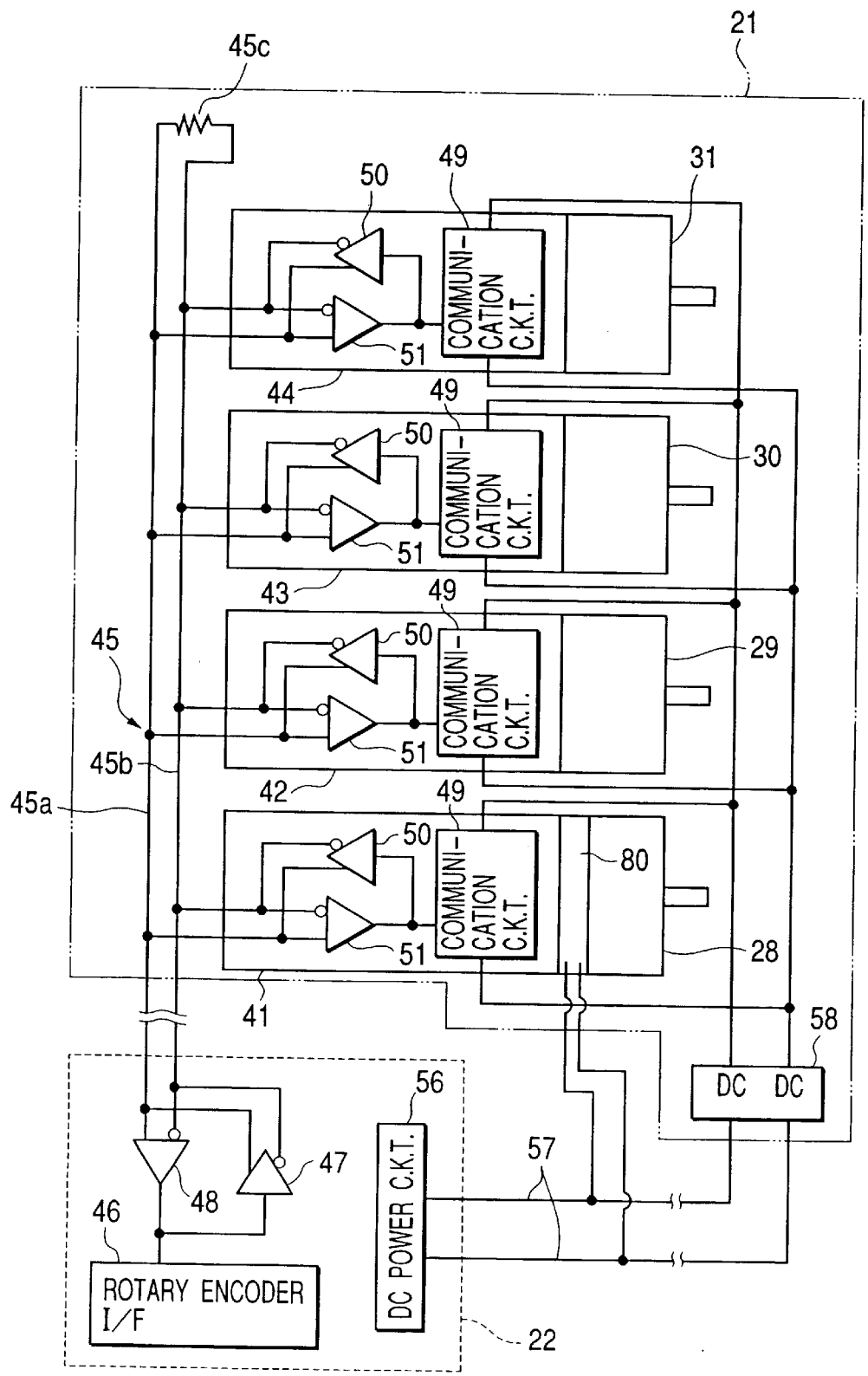
FIG. 2 is a block diagram which shows a robot and a robot control driver.

Referring now to the drawings, particularly to FIG. 1, there is shown a robot system according to the present invention which consists essentially of the robot control driver 22 for controlling the robot 21. The robot 21 is, for example, a horizontal articulated assembling robot and includes the base 23, the first arm 24 rotatably journalled in the base 23, the second arm 24 rotatably journalled in the first arm 24, the wrist 26 mounted in the second arm 24 rotatably and movably in a vertical direction, and the hand 27 mounted in the wrist 26. The pivotal movement of the first and second arms 24 and 25 and vertical and rotational movement of the wrist 26 are controlled by the servomotors 28 to 31, as shown in FIGS. 2 and 3, respectively.

Figure 3:
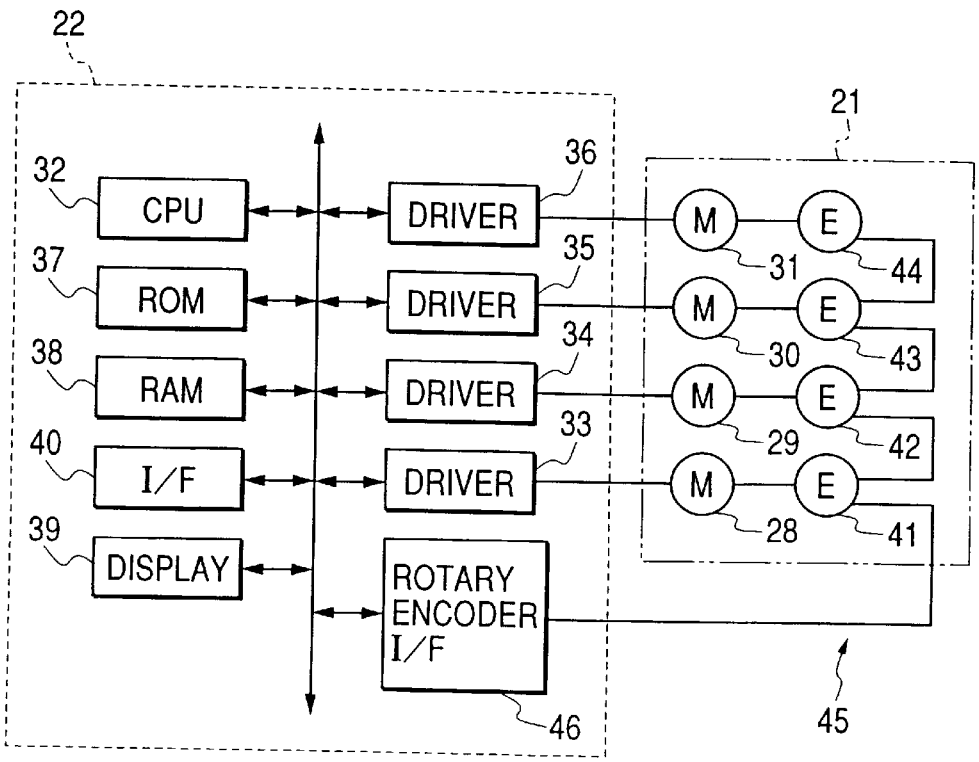
FIG. 3 is a block diagram which shows a circuit structure of a robot and a robot control driver.

The robot control driver 22 includes, as shown in FIG. 3, the CPU 32 and the drive circuits 33 to 36 for the servomotors 28 to 31. The CPU 32 is connected to the ROM 37 storing therein a robot system program, the RAM 38 storing therein a robot operation program, the display 39 equipped with a CRT, and the interface (I/F) 40 for connection to an external device such as a teach pendant.

The servomotors 28 to 31 have disposed therein the rotary encoders 41 to 44 which are designed to measure angular positions of the servomotors 28 to 31 and output signals indicative thereof to the rotary encoder I/F 46 of the robot control driver 22 through the serial communication path 45, as will be described later in detail, respectively.

The CPU 32 provides operation signals to the drive circuits 33 to 36. The drive circuits 33 to 36 are responsive to the operation signals to supply currents to the servomotors 28 to 31 to activate them, respectively. The CPU 32 also reads required rotational positions (i.e., angular positions) of the servomotors 28 to 31 out of the operation program stored in the RAM 38, detects actual rotational positions of the servomotors 28 to 31 based on the signals inputted from the rotary encoders 41 to 44 through the rotary encoder I/F 46 to determine differences between the required rotational positions and the actual rotational positions, and provides drive signals to the drive circuits 33 to 36 according to the determined differences, respectively, for moving the first and second arms 4 and 25 and the wrist 26 in accordance with the operation program.

The serial communication path 45 is, as shown in FIG. 2, formed with a half-duplex balanced circuit. Specifically, an input/output terminal of the rotary encoder I/F 46 of the robot control driver 22 is connected to an input terminal of the differential driver 47 and an output terminal of the differential receiver 48. A non-inverting output terminal of the differential driver 47 and a non-inverting input terminal of the differential receiver 48 are connected to the signal line 45a which constitutes the serial communication path 45 together with the signal line 45b. An inverting output terminal of the differential driver 47 and an inverting input terminal of the differential receiver 48 are connected to the signal line 45b of the serial communication path 45.

To an input/output terminal of the communication circuit 49 of each of the rotary encoders 41 to 44 of the robot 21, an input terminal of one of the differential drivers 50 and an output terminal of one of the differential receivers 51 are connected. A non-inverting output terminal of each of the differential drivers 50 and a non-inverting input terminal of each of the differential receivers 52 are connected to the signal line 45a, while an inverting output terminal of each of the differential drivers 50 and an inverting input terminal of each of the differential receivers 51 are connected to the signal line 45b. The serial communication path 45 has the terminal resistor 45c disposed between the signal lines 45a and 45b.

An output signal of the rotary encoder 1/F 46 is, thus, modulated and converted by the differential driver 47 into two signals which are inverted in level and which are, in turn, recovered by the differential receiver 51 of each of the rotary encoders 41 to 44. Similarly, a signal to be outputted from each of the rotary encoders 41 to 44 is modulated and converted by the differential driver 50 into two signals which are inverted in level and which are, in turn, recovered by the differential receiver 48 of the robot control driver 22.

Figure 4:
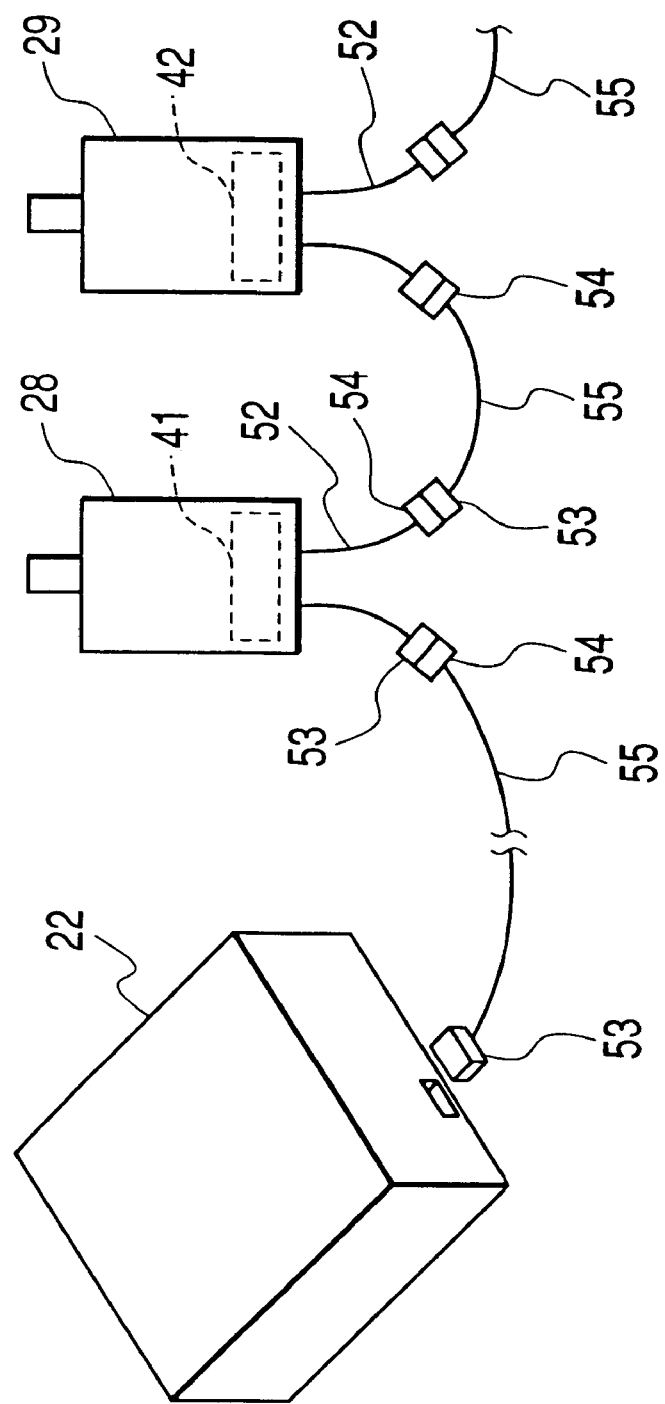
FIG. 4 is a perspective view which shows wiring between a robot control driver and servomotors.

For improvement of wiring of the serial communication path 45, the twin cable 52, as shown in FIG. 4, which is part of the serial communication path 45 is preconnected to each of the rotary encoders 41 to 44 of the servomotors 28 to 31 (the servomotors 30 and 31 are omitted for the brevity of illustration). Each of the twin cable 52 has connected to ends thereof the male connector 53 and the female connector 54. The female connector 54 of each of the rotary encoders 41 to 44 is connected to the male connector 53 of the adjacent one through the intermediate twin cable 55 having disposed on ends thereof the male and female connectors 53 and 54. The male connector 53 of the rotary encoder 41 is connected to the robot control driver 22 through the twin cable 55.

The communication circuit 49 of each of the rotary encoders 41 to 44 is electrically powered by the robot control driver 22. Specifically, the robot control driver 22 has, as shown in FIG. 2, the dc power circuit 56 which converts commercial ac power into dc power. The dc power circuit 56 is connected through a pair of power supply lines 57 to the DC/DC converter 58 installed in the robot 21. The dc output of the dc power circuit 56 is, for example, 24 volts which is stepped down to 5 volts by the DC/DC converter 58 and supplied to each of the communication circuits 49.

The dc power circuit 56 is essentially a power supply for operating an electromagnetic brake 80 (only one is shown in FIG. 2 for the brevity of illustration) installed in each of the servomotors 28 to 31. The electromagnetic brake 80 consists of a rotary friction disc mounted on a rotor of each servomotor, a stationary friction disc mounted on a motor casing to be movable linearly, a spring urging the stationary friction disc into constant engagement with the rotary friction disc to brake the servomotor, and an electromagnet bringing the stationary friction disc into disengagement from the rotary friction disc against the spring pressure. When the servomotor 28 to 31 are being actuated, the robot control driver 22 turns on the electromagnetic brakes 80 to release the brakes applied to the servomotors 28 to 31. Alternatively, when the servomotors 28 to 31 are at rest, the robot control driver 22 turns off the electromagnetic brakes 80 to apply the brakes to the servomotors 28 to 31.

The DC/DC converter 48, as described above, converts an input of 24 volts into 5 volts for operating each of the rotary encoders 41 to 44. This allows a constant voltage to be always supplied to the rotary encoders 41 to 44 even if a voltage drop occurs through the power supply lines 57 and also eliminates the need for power supply lines used exclusively for the rotary encoders 41 to 44, thus resulting in decreased wires between the robot 21 and the robot control driver 22.

Figure 5:
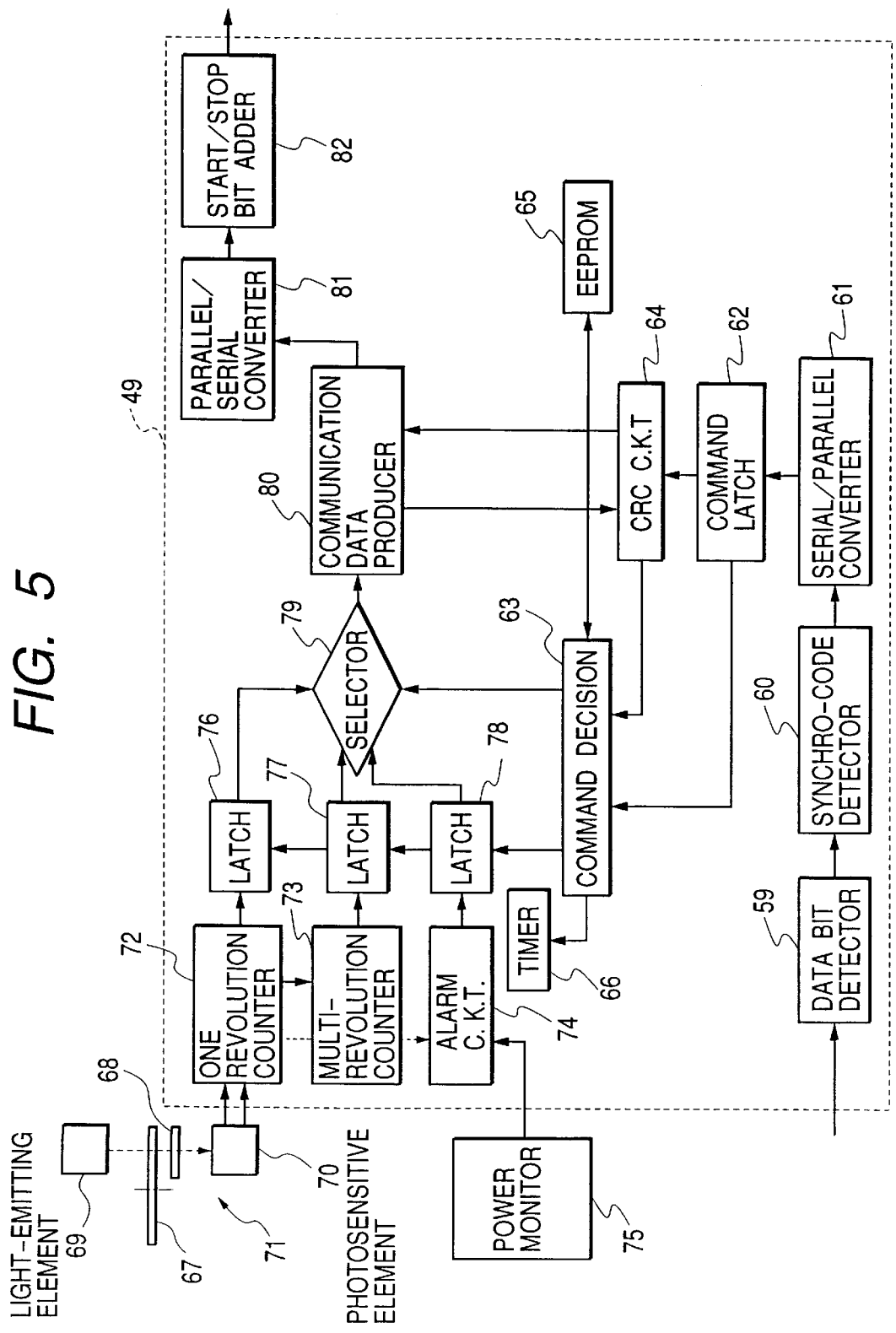
FIG. 5 is a block diagram which shows a communication circuit of each rotary encoder.

The communication circuit 49 of each of the rotary encoders 41 to 44 has, as shown in FIG. 5, a data bit detecting circuit 59 which detects start and stop bits of an input signal from the differential receiver 51. The input signal has a synchronous code decoded by the synchro-code detecting circuit 60 and is outputted as serial signals to the serial-parallel converter 61. The serial-parallel converter 61 converts the input serial signals into parallel signals and output them to the command latch circuit 62.

The command latch circuit 62 latches the parallel signals inputted from the serial-parallel converter 61 and supplies them to the command determining circuit 63. The command determining circuit 63 determines the contents of the input signal. The CRC circuit 64 checks errors contained in the input signal to the command determining circuit 63. When the CRC circuit 64 outputs a non-error signal indicating that the input signal to the command determining circuit 63 is not in error, the command determining circuit 63 gains access to the EEPROM 65, starts the timer 66, or outputs latch and select signals according to the contents of the input signal. The EEPROM 65 stores encoder ID numbers which are assigned to the rotary encoders 41 to 44, respectively, and which may be changed by an external device.

Each of the rotary encoders 41 to 44 includes the rotation detecting assembly 71 consisting of the disc 67 rotating along with corresponding one of the servomotors 28 to 31, the grating 68, a plurality of light-emitting elements 69, and a plurality of photosensitive elements 70. The photosensitive elements 70 provide outputs to the one revolution counter 72. The one revolution counter 72 monitors the outputs from the photosensitive elements 70 to determine a rotational position of corresponding one of the servomotors 28 to 31 in each rotation thereof. The multirevolution counter 73 determines a rotation angle (i.e., an absolute position) of corresponding one of the servomotors 28 to 31 relative to the origin (i.e., a reference position) based on an output from the one revolution counter 72.

The one revolution counter 72 and the multirevolution counter 73 are both connected to the alarm circuit 74 which detects a failure in operation of each of the one revolution counter 72 and the multirevolution counter 73. The power monitor 75 monitors the dc power supplied from the DC/DC converter 58 to each of the rotary encoders 41 to 44 and outputs an alarm signal to the alarm circuit 74 when the dc power exhibits an abnormal condition. The one revolution counter 72, the multirevolution counter 73, and the alarm circuit 74 are connected to the latch circuits 76, 77, and 78, respectively. The latch circuits 76 to 78 latch inputs from the one revolution counter 72, the multirevolution counter 73, and the alarm circuit 74 in response to a latch signal from the command decision circuit 63 and outputs them to the select circuit 79. The select circuit 79 is responsive to a select signal outputted from the command decision circuit 63 to select one of the inputs from the latch circuits 76 to 78 and outputs it to the communication data producing circuit 80. The communication data producing circuit 80 adds a CRC code (i.e., a check code) provided by the CRC circuit 64 to the input data to provide communication data to the parallel-serial converter 81. The parallel-serial converter 81 converts the input communication data into a serial signal and outputs it to the start/stop bit adder 82. The start/stop bit adder 82 adds a start and a stop bit to the input serial signal and outputs it to the serial communication path 45 through the differential driver 50.

Figure 6A:
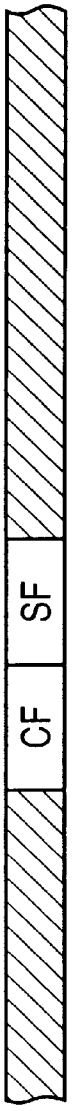
FIG. 6(a) shows a format of data outputted from a robot control driver.
Figure 6B:
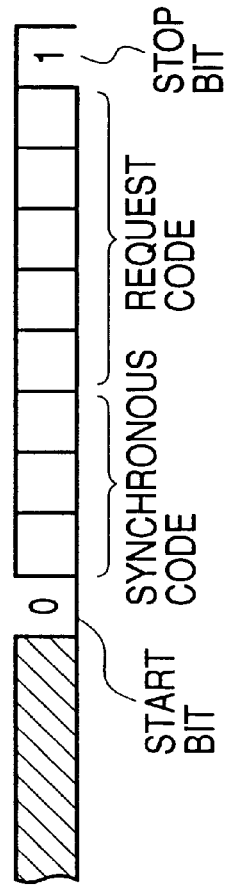
FIGS. 6(b) and 6(c) show formats of a control field CF and a status field SF of the data of FIG. 6(a)
Figure 6C:
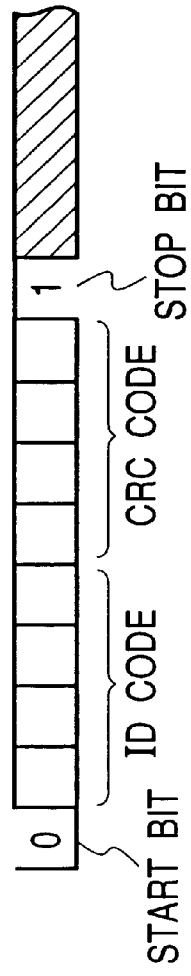

FIG. 6(*a*) shows a frame format of a data signal transmitted from the robot control driver 22 to each of the rotary encoders 41 to 44 which consists of a control field CF and a status field SF. The robot control drivers 22 transmits the control field CF and the status field SF to each of the rotary encoders 41 to 44 in the same order.

The control field CF consists of, as shown in FIG. 6(*b*), a start bit, a three-bit synchronous code, a five-bit request code, and a stop bit. The status field SF consists of, as shown in FIG. 6(*c*), a start bit, a four-bit ID code indicative of the encoder ID number of corresponding one of the rotary encoders 41 to 44, a four-bit CRC code, and a stop bit.

The request code of the control field CF is one of four codes which request an individual operation mode, a sequential operation mode, an individual error status operation mode, and a sequential error status operation mode, respectively.

In the individual operation mode, the robot control driver 22 outputs a signal to the robot 21, as will be described later in detail, which includes an individual operation request code and specified one of the four encoder ID numbers. The robot 21 activates only one of the rotary encoders 41 to 44 to which the specified encoder ID number is assigned.

In the sequential operation mode, the robot control driver 22 outputs signals, in sequence, to the robot 21 which include a sequential operation request code and all the encoder ID numbers. The robot 21 activates all the rotary encoders 41 to 44 to provide data in the order in which the encoder ID numbers are inputted from the robot control driver 22.

In the individual error status operation mode, the robot control driver 22 outputs a signal to the robot 21 which includes an individual error status operation request code and one of the encoder ID numbers to the robot 21. The robot 21 activates one of the rotary encoders 41 to 44 to which the inputted one of the encoder ID numbers is assigned to output data on an error thereof.

In the sequential error status operation mode, the robot control driver 22 outputs a sequential error status operation request signal and all the encoder ID numbers, in sequence, to the robot 21. The robot 21 activates all the rotary encoders 41 to 44 to provide data on errors thereof in the order in which the encoder ID numbers are inputted from the robot control driver 22.

FIG. 7(*a*) shows a frame format of a data signal transmitted from each of the rotary encoders 41 to 44 which consists of a control field CF, a status field SF, position data fields DF including a maximum of four fields: DF1, DF2, DF3, and DF4, and a CRC field RF. The robot control drivers 22 transmits these fields to each of the rotary encoders 41 to 44 in the same order. When the one revolution data is outputted, only the two position data fields DF1 and DF2 are used. When the absolute position data is also outputted, all the data fields DF1 to DF4 are used.

Figure 7A:
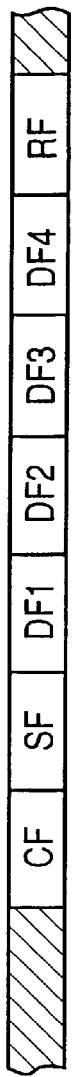
FIG. 7(a) shows a format of data outputted from each rotary encoder.
Figure 7B:
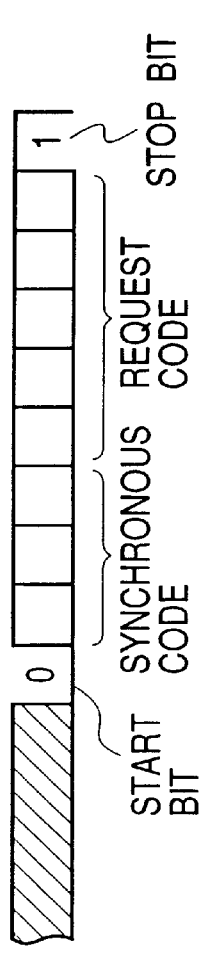
FIGS. 7(b), 7(c), 7(d), and 7(e) show formats of a control field CF, a status field SF, a position data field DF, and a CRC field RF of the data of FIG. 7(a), respectively.

The control field CF consists of, as shown in FIG. 7(b), a start bit, a three-bit synchronous code, and a five-bit request code for logically reversing the most significant bit of the request code transmitted from the robot control driver 22 and returning it to the robot control driver 22, and a stop bit.

Figure 7C:
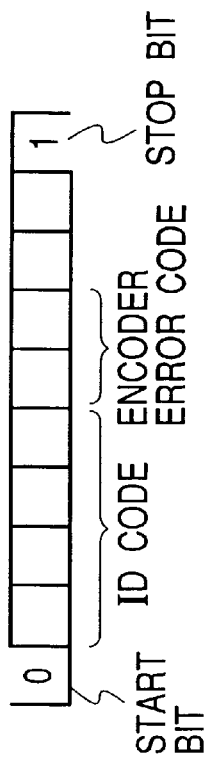

The status field SF consists of, as shown in FIG. 7(c), a start bit, a four-bit ID code indicative of the encoder ID number, a two-bit error code, an indeterminate bit, a preset bit, and a stop bit.

Figure 7D:
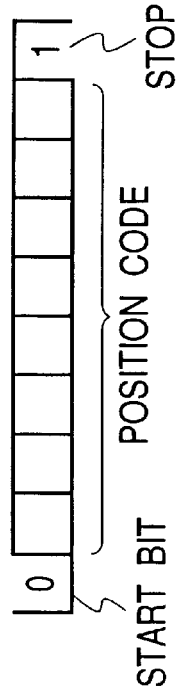

Each of the position data fields DF1 to DF4 consists of, as shown in FIG. 7(d), a start bit, an eight-bit position code, and a stop bit.

Figure 7E:
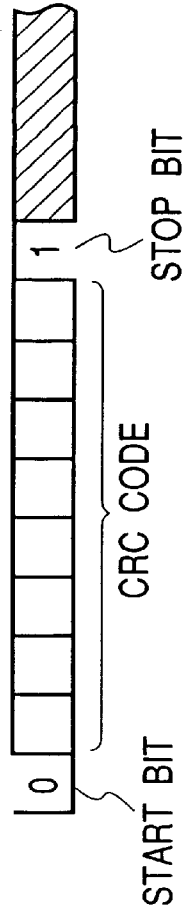

The CRC field RF consists of, as shown in FIG. 7(e), a start bit, an eight-bit CRC code, and a stop bit.

The robot control driver 22 requests each of the rotary encoders 41 to 44 to output the one revolution data and multirevolution data through the one revolution counter 72 and the multirevolution counter 73 for determining the absolute position of one of the servomotors 28 to 31. This is achieved in the following manner. The robot control driver 22 first outputs to the rotary encoders 41 to 44 signals in which the request code of the control field CF is set to the individual operation request code, and the ID code of the status field SF is set to preselected first one of the encoder ID numbers of the rotary encoders 41 to 44. Each of the rotary encoders 41 to 44 analyzes the request code in the received signal through the command decision circuit 63 and verify whether its own ID encoder number matches the one indicated by the received signal or not. One of the rotary encoders 41 to 44 whose ID encoder number matches the one indicated by the received signal outputs latch signals to the latch circuits 76, 77, and 78 through the command decision circuit 63 and turns on the select circuit 79 to switch connections between the latch circuits 76, 77, and 78 and the communication data producing circuit 80 selectively to transmit the one revolution data latched by the latch circuit 76, the multirevolution data latched by the latch circuit 77, and the error data latched by the latch circuit 78, in sequence, to the communication data producing circuit 80.

The communication data producing circuit 80 produces parallel data and transmits them to the parallel-serial converter 81.

The parallel-serial converter 81 converts the input into serial data and transmits them to the start/stop bit adder 82. The start/stop bit adder 82 adds start and stop bits to the inputted serial data and outputs them to the robot control driver 22 through the serial communication path 45.

The robot control driver 22 outputs signals to the others of the rotary encoders 41 to 44 to have them perform the same operation as described above in sequence and collects position data from all the rotary encoders 41 to 44 to determine absolute positions thereof which are used in executing the operation program, as will be discussed later in detail.

After starting the operation of the robot 21, the robot control driver 22 outputs signals in which the request code of the control field CF is set to the sequential operation code to request the rotary encoders 41 to 44 to output only the one revolution data every 500 μsec. This accumulates the one revolution data, thereby allowing the absolute positions of the rotary encoders 41 to 44 to be determined without requesting outputs of absolute position data. The time between output of the request code and reception of the position information from the rotary encoders 41 to 44 may, thus, be shortened, thereby resulting in improved accuracy of positional control of the robot 21.

Figure 8:
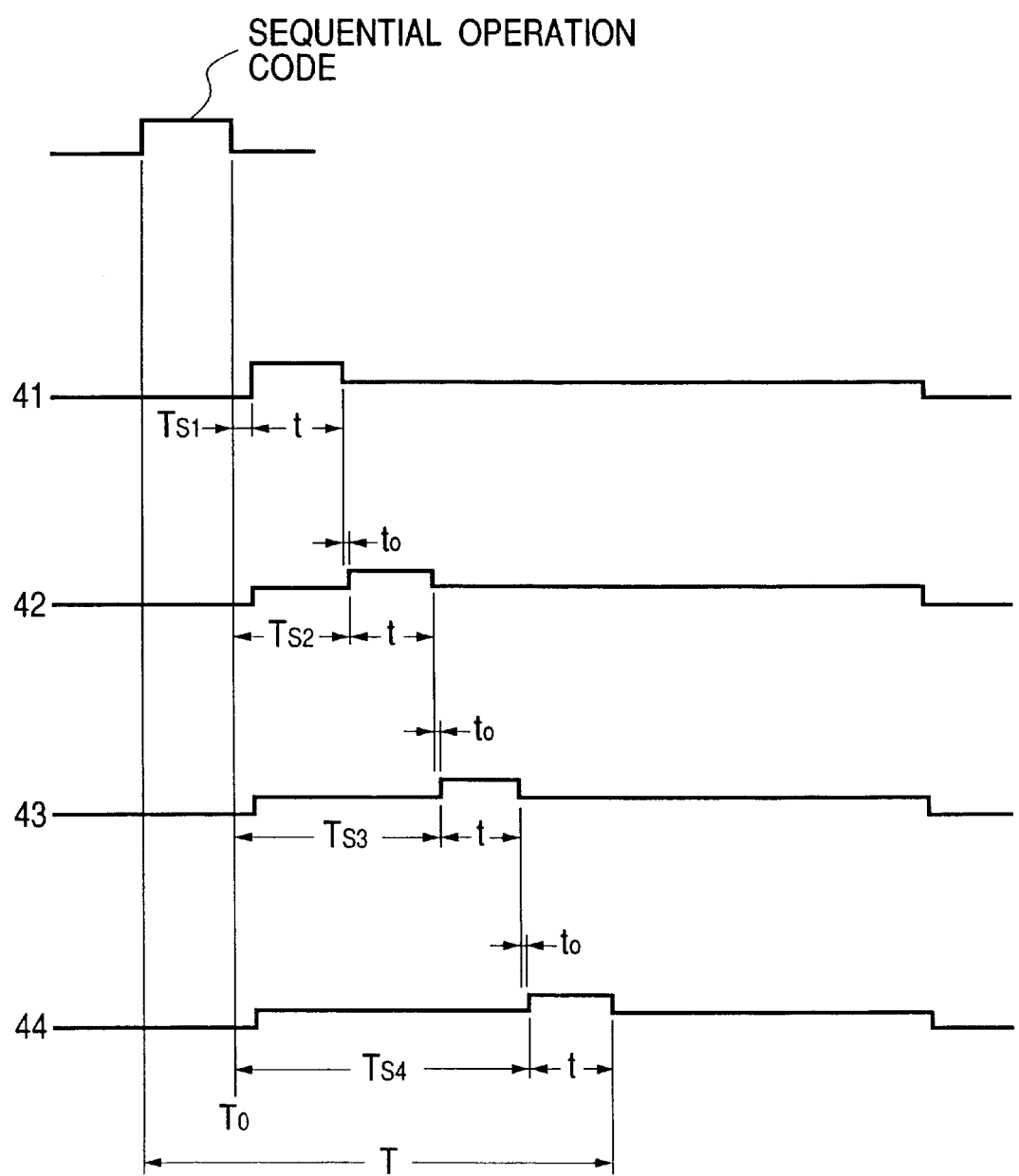
FIG. 8 is a time chart which shows operations of rotary encoders in response to a sequential operation code.

When the robot control driver 22 outputs the signals in which the request code of the control field CF is set to the sequential operation code, the rotary encoders 41 to 44 receive them at the same time and analyze the request code through the command decision circuit 63. When having analyzed the request code, the command decision circuit 63 of each of the rotary encoders 41 to 44 turns on the timer 66 at time T0 as shown in FIG. 8.

In the following discussion, it is assumed that a sequence of encoder ID numbers are assigned to the rotary encoders 41, 42, 43, and 44, respectively. When the timer 66 of the rotary encoder 41 having the first encoder ID number reaches time Ts1, as shown in FIG. 8, the command decision circuit 63 of the rotary encoder 41 outputs latch signals to the latch circuits 76 to 78 to latch the one revolution counter 72, the multirevolution counter 73, and the alarm circuit 74 and also outputs a select signal to the select circuit 79. The select circuit 79 first outputs the one revolution data latched by the latch circuit 74 to the transmission data producing circuit 80 and then the error data latched by the latch circuit 74 to the transmission data producing circuit 80. The one revolution data and the error data inputted, in sequence, to the transmission data producing circuit 80 are transmitted to the serial communication path 45 in the format as shown in FIGS. 7(a) to 7(e).

Next, when the timer 66 of the rotary encoder 42 having the second encoder ID number reaches time Ts2 (=Ts1+t+t0), the rotary encoder 42 transmits the one revolution data and the error data to the serial communication path 45 in the same manner as described above. Note that t indicates the time required for each of the rotary encoders 41 to 44 to perform a sequence of the above operations to provide the one revolution data in the format as shown in FIGS. 7(a) to 7(e), and t0 is a given marginal time.

Similarly, when the timer of the rotary encoder 43 having the third encoder ID number reaches time Ts3 (=Ts1+2t+2t0=Ts2+t+t0), the rotary encoder 43 transmits the data to the serial communication path 45. When the timer of the rotary encoder 44 having the fourth encoder ID number reaches time Ts4 (=Ts1+3t +3t0=Ts3+t+t0), the rotary encoder 43 transmits the data to the serial communication path 45.

The time duration T between output of the request signals from the robot control driver 22 and reception of the data from all the rotary encoders 41 to 44 in a normal operating condition is 100 lsec. in this embodiment which is prestored in the robot control driver 22. The robot control driver 22 compares an actual time required for signal transmission between the robot control driver 22 and the rotary encoders 41 to 44 with the time duration T for detecting transmission errors. The transmission errors are also detected by verifying whether the data format is correct or not and by CRC.

FIG. 9 shows a flowchart of a program or sequence of logical steps performed by the robot control system according to the invention.

After entering the program, the routine proceeds to step 10 wherein one of the individual operation mode, the sequential operation mode, the individual error status operation mode, and the sequential error status operation mode is selected. Assuming that the robot 21 is operating, and the sequential operation mode is selected, the robot control driver 22 outputs in step 20 signals in which the request code is set to the sequential operation code.

The rotary encoders 41 to 44 are responsive to the signals from the robot control driver 22 to activate the timers 66 thereof.

When the time To is reached, the rotary encoder 41 having the first encoder ID number transmits the positional data to the robot control driver 22 in the manner as described above. Subsequently, the rotary encoders 42 to 44 transmit the positional data to the robot control driver 22 at time intervals of (t+t0), respectively.

The robot control driver 22 receives in step 30 the positional data from the rotary encoders 41 to 44 in sequence and determines in step 40 whether the transmission error has occurred or not. When the transmission of the signal from the robot control driver 22 to at least one of the rotary encoders 41 to 44 was in error, the fact thereof is contained in the data sent from the at least one of the rotary encoders 41 to 44. The robot control driver 22 thus analyzes the data from the rotary encoders 41 to 44 to detect the transmission error. Alternatively, when the transmission of the data to the robot control driver 22 from at least one of the rotary encoders 41 to 44 was in error, it is, as described above, detected by analyzing the data format, by CRC, and by comparing an actual time duration between output of the signals from the robot control driver 22 and reception of the data from each of the rotary encoders 41 to 44 with the given time duration T.

If a NO answer is obtained in step 40 meaning that there is no transmission error, then the routine proceeds to step 50 wherein it is determined whether each of the rotary encoders 41 to 44 is malfunctioning or not. This determination is made by detecting the error data transmitted from the rotary encoders 41 to 44. If a NO answer is obtained in step 50 meaning that all the rotary encoders 41 to 44 are operating normally, then the routine returns back to step 10 and executes the program again after a lapse of 500 μsec following the first program execution. A sequence of these operations are illustrated in FIG. 10(a).

If a YES answer is obtained in step 40 meaning that the transmission error has occurred, then the routine proceeds to step 60. For example, when the transmission of the signal to the rotary encoder 41 was in error, the position of the rotary encoder 41 is estimated. This estimation is achieved based on the position of the rotary encoder 41 derived one program cycle earlier and a change in position of the rotary encoder 41 through the previous program cycles.

The routine proceeds to step 70 wherein it is determined whether the transmission error has continued to occur a preselected number of times (e.g., two times) or not. If the number of times the transmission error has occurred is one (1), then the routine returns back to step 10. Alternatively, if the two consecutive transmission errors have occurred, then the routine proceeds to step 80 wherein the servomotors 28 to 31 are turned off to step the robot 21. The routine proceeds to step 90 wherein the fact that the robot 21 has been stopped due to the transmission error is indicated through the display 39.

If a YES answer is obtained in step 50 meaning that at least one of the rotary encoders 41 to 44 is malfunctioning, then the routine proceeds to step 100 wherein the servomotors 28 to 31 are turned off to stop the robot 21. The routine proceeds to step 110 wherein the fact that the robot 21 has been stopped due to the malfunction of the rotary encoders 41 to 44 is indicated through the display 39. A sequence of these operations are illustrated in FIG. 10(b).

The robot system of this embodiment, as apparent from the above discussion, establishes individual communications between the robot control driver 22 and the rotary encoders 41 to 44 through the serial communication path 45 only. This eliminates the need for increasing the communication path 45 when the rotary encoders are increased, thereby minimizing the possibility of an error in signal transmission between the robot control driver 22 and each rotary encoder due to wire-breakage in the communication path 45 and also minimize the space occupied by the communication path 45 in the robot 21, thereby allowing the overall size of the robot 21 to be reduced.

Figure 11:
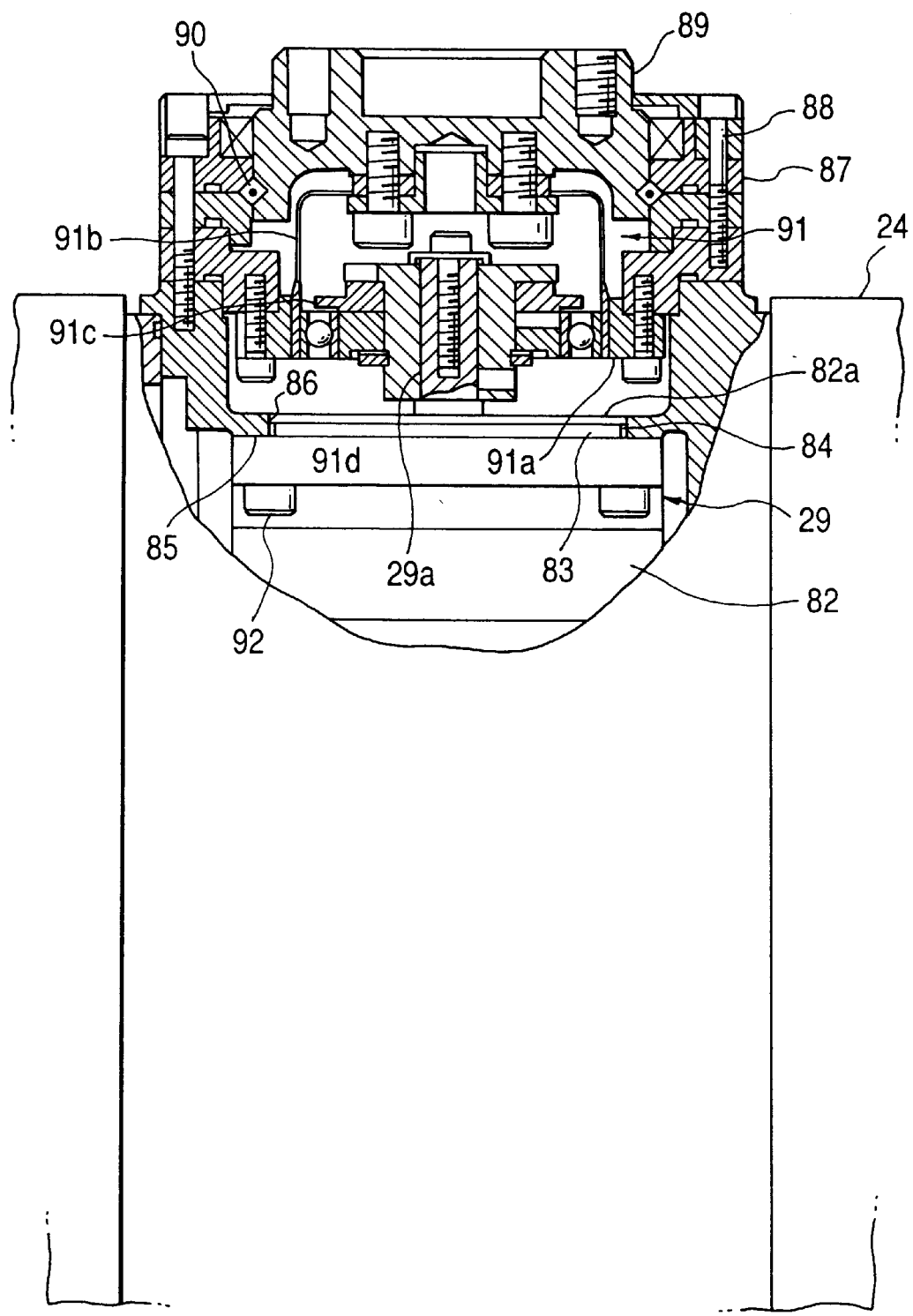
FIG. 11 is a partially cross sectional view which shows installation of a servomotor in a robot according to the second embodiment of the invention.
Figure 12:
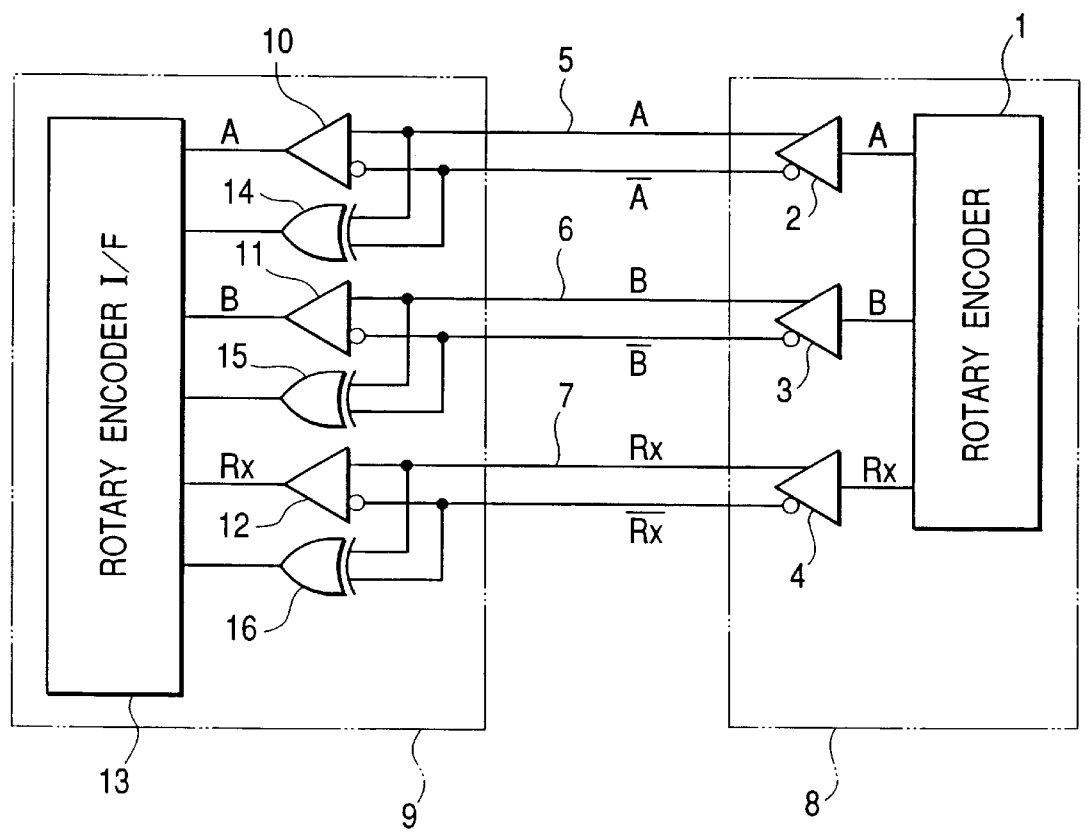
FIG. 12 is a block diagram which shows a conventional robot control system.

FIG. 11 shows an improvement on installation of the servomotors 28 to 31 in the robot 21 which eliminates the need for grounding leads. The installation of the servomotors 28 to 31 is identical with each other, and the drawing represents only the servomotor 29 mounted in the first arm 24 for the brevity of illustration. The motor casing 82 of the servomotor 29 has the faucet or spigot 82a formed on the head thereof. The spigot 82a has formed in a peripheral surface thereof the annular groove 83 in which the O-ring 84 is fitted.

The first arm 24 of the robot 21 has the opening or socket 86 formed in the motor mount 85. The gear casing 87 is secured on the motor mount 85 using the bolts 88. The rotary member 89 in which the arm 25 is installed is supported rotatably by the gear casing 87 through the bearing 90.

Within the gear casing 87, the speed reducer 91 such as a harmonic drive (trade name) is disposed which includes the circular spline 91a, the flexspline 91b, and the wave generator 91d. The circular spline 91a has inner teeth and is mounted in the gear casing 87. The flexspline 91b is made of a cup-shaped elastic metal and connected to the rotary member 89. The flexspline 91b has formed in a peripheral wall thereof teeth meshing with the inner teeth of the circular spline 91a. The wave generator 91d is oval and fitted in the flexspline 91b through the ball bearing 91c. The number of teeth of the flexspline 91b is smaller than that of the circular spline 91a by one or two.

The installation of the servomotor 29 in the motor mount 85 is achieved by inserting the spigot 82a of the motor casing 82 into the socket 86 of the motor mount 85 and fastening the bolts 92. The O-ring 84 is deformed slightly between the spigot 82a of the motor casing 82 and the inner wall of the socket 86 of the motor mount 85, thereby establishing a light-tight seal therebetween to avoid the leakage of oil out of the gear casing 87.

The output shaft 29a of the servomotor 29 is fitted in the wave generator 91d of the speed reducer 91. When the output shaft 29a is rotated together with the wave generator 91d, the rotation is reduced in speed through engagement between the flexspline 91b and the circular spline 91a and transmitted to the rotary member 89 through the flexspline 91b, thereby moving the second arm 25 pivotably.

In a conventional structure, the liquid-tight seal between the motor casing 82 and the motor mount 85 is established by interposing a gasket between an upper surface of the motor casing 81 around the spigot 82a and a lower surface of the motor mount 85. The installation of the gasket insulates the motor casing 82 electrically from the robot 21. A high voltage of 220 V is usually applied to the servomotor 29, and thus the motor casing 82 needs to be grounded using any measures. To this end, the conventional structure has a grounding lead disposed within the robot 21 which connects the motor casing 82 to ground. This, however, requires an additional wiring space for the lead within the robot 21.

In the structure as shown in FIG. 11, the use of the O-ring 84 allows the upper surface of the motor casing 82 around the spigot 82a to be connected directly to the lower surface of the motor mount 85. The robot 21 is made of an aluminum alloy and thus grounds the motor casing 82. This eliminates the need for the grounding lead, as required in the conventional structure, which may pick up electrical noise interfering with the operation of the robot 21.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims. For example, an error in transmission between the robot control driver 22 and each of the rotary encoders 41 to 44 in the individual operation mode may be detected based on the time between output of the request code from the robot control driver 22 to specified one of the rotary encoders 41 to 44 and reception of the data therefrom.

What is claimed is:

1. A robot control apparatus comprising:

a plurality of servomotors which move preselected components of a robot, respectively;

a plurality of position detectors which detect rotational positions of said servomotors and output the rotational positions in the form of serial data, respectively;

a motor control driver which controls said servomotors based on the rotational positions detected by said position detectors and required positions, wherein said motor control driver detects an error in transmission between each of said position detectors and said motor control driver by checking a format of the serial data outputted from each of said position detectors, an error check code contained in the serial data, and a time required for the transmission between each of said position detectors and said motor control driver; and a serial communication path disposed between said motor control driver and said position detectors to transmit request signals provided by said motor control driver to said position detectors to request said position detectors to output the rotational positions, said position detectors being connected to said serial communication path in parallel to each other, respectively; and a storage circuit which stores therein the rotational positions detected by said position detectors in a cycle and a position estimating circuit which estimates the rotational positions of said servomotors based on the rotational positions derived in previous cycles when transmission between said position detectors and said motor control driver is in error in this cycle, and wherein said motor control driver controls said servomotors based on the estimated rotational positions.

2. A robot control apparatus as set forth in claim 1, wherein the motor control driver stops the servomotors when an error in transmission between the position detectors and the motor control driver continues to occur a preselected number of times.

3. A robot control apparatus comprising:

a plurality of servomotors which move preselected components of a robot, respectively, each servomotor including a motor casing having formed thereon a spigot and an annular sealing member installed in the spigot, the robot having a motor mount which has formed therein a socket into which the spigot of the motor casing is fitted through the annular sealing member with a portion of the motor mount around the socket connecting directly with a portion of the motor casing around the spigot for grounding the motor casing through the robot;

a plurality of position detectors which detect rotational positions of said servomotors and output the rotational positions in the form of serial data, respectively;

a motor control driver which controls said servomotors based on the rotational positions detected by said position detectors and required positions; and a serial communication path, connecting said motor control driver and said position detectors, to transmit request signals provided by said motor control driver to said position detectors to request said position detectors to output the rotational positions, said position detectors being connected to said serial communication path in parallel to each other, respectively.

* * * * *